(12) United States Patent
Li

(10) Patent No.: US 12,434,593 B2
(45) Date of Patent: Oct. 7, 2025

(54) HOISTING CARRIER VEHICLE OF REPLACEABLE BATTERIES

(71) Applicants: ZHEJIANG GEELY HOLDING GROUP CO., LTD., Hangzhou (CN); ZHEJIANG GEELY FARIZON NEW ENERGY COMMERCIAL VEHICLE GROUP CO., LTD., Hangzhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY FARIZON NEW ENERGY COMMERCIAL VEHICLE GROUP CO., LTD., Hangzhou (CN)

( * ) Notice: Subject to any disclaimer, the term of this patent is extended or adjusted under 35 U.S.C. 154(b) by 327 days.

(21) Appl. No.: 18/314,998

(22) Filed: May 10, 2023

(65) Prior Publication Data

US 2023/0302952 A1  Sep. 28, 2023

Related U.S. Application Data

(63) Continuation of application No. PCT/CN2020/139408, filed on Dec. 25, 2020.

(30) Foreign Application Priority Data

Nov. 10, 2020 (CN) .......................... 202011246789.0

(51) Int. Cl.
B60L 53/80 (2019.01)
B60K 1/04 (2019.01)

(52) U.S. Cl.
CPC ................ B60L 53/80 (2019.02); B60K 1/04 (2013.01); B60K 2001/0466 (2013.01)

(58) Field of Classification Search
CPC .......... B60L 53/80; B60L 50/64; B60L 50/66; B60L 2200/36; B60K 1/04;
(Continued)

(56) References Cited

U.S. PATENT DOCUMENTS 10,899,214 B2 * 1/2021 Sloan ....................... B60K 1/04
11,040,610 B2 * 6/2021 Sloan ..................... B60L 50/66
(Continued)

FOREIGN PATENT DOCUMENTS

CN 105644639 A 6/2016
CN 205853862 U * 1/2017
(Continued)

OTHER PUBLICATIONS

Translated CN-111137372-A (Year: 2025).*
(Continued)

*Primary Examiner* — James A Shriver, II
*Assistant Examiner* — Ian Bryce Shelton
(74) *Attorney, Agent, or Firm* — Westbridge IP LLC

(57) ABSTRACT

Disclosed is a hoisting carrier vehicle of replaceable batteries. The hoisting carrier vehicle includes a battery box whose cross section is in a shape of inverted concave font. The battery box is mounted by a locking device on the longitudinal beam of the carrier vehicle in a way of saddle. The battery box includes a battery and a battery frame. The battery box of the hoisting carrier vehicle in the application adopts an inverted concave font structure and the middle portion of the inverted concave font is connected to the longitudinal beam, which may effectively lower the center of gravity of the battery box. Secondly, an inclining prevention device is provided to prevent the battery box from inclining forward when braking, thereby to effectively increase the (Continued)

stability of the battery box. In addition, the battery box may be replaced quickly through the quick locking and unlocking of the locking device.

3 Claims, 4 Drawing Sheets

(58) Field of Classification Search
CPC .... B60K 2001/0466; B60K 2001/0455; Y02T 10/70; Y02T 10/7072; Y02T 10/72; B60Y 2200/142; B60Y 2200/91
See application file for complete search history.

(56) References Cited

U.S. PATENT DOCUMENTS

| | | | | |
|---|---|---|---|---|
| 11,043,714 | B2* | 6/2021 | Sloan | B60K 1/04 |
| 11,685,268 | B2* | 6/2023 | Sjöholm | B62D 27/02 |
| | | | | 180/68.5 |
| 11,932,098 | B2* | 3/2024 | Hendriks | B60L 50/66 |
| 2020/0259143 | A1* | 8/2020 | Sloan | H01M 50/262 |
| 2020/0331334 | A1* | 10/2020 | Sloan | B60L 50/66 |
| 2020/0331536 | A1* | 10/2020 | Sloan | B60L 50/66 |
| 2021/0380001 | A1* | 12/2021 | Hörder | H01M 50/204 |
| 2021/0387534 | A1* | 12/2021 | Sjöholm | B60L 50/66 |

FOREIGN PATENT DOCUMENTS

| | | | | |
|---|---|---|---|---|
| CN | 206171159 | U | * 5/2017 | |
| CN | 207790296 | U | * 8/2018 | B60K 1/04 |
| CN | 207842904 | U | * 9/2018 | B60L 53/30 |
| CN | 209008372 | U | 6/2019 | |
| CN | 110614911 | A | * 12/2019 | |
| CN | 111002844 | A | * 4/2020 | B60L 50/64 |
| CN | 210325889 | U | * 4/2020 | B60K 1/04 |
| CN | 111137372 | A | * 5/2020 | |
| CN | 210941319 | U | * 7/2020 | B60K 1/04 |
| CN | 111845437 | A | * 10/2020 | B60K 1/04 |
| CN | 211685401 | U | * 10/2020 | |
| CN | 211764962 | U | * 10/2020 | B60L 50/64 |
| CN | 213383896 | U | * 6/2021 | B60L 50/64 |
| DE | 102012108769 | A1 | 3/2014 | |
| JP | S4829509 | U | 4/1973 | |
| JP | 2004132539 | A | 4/2004 | |
| JP | 2013006568 | A | 1/2013 | |
| JP | 2015500928 | A | 1/2015 | |
| WO | 2020041630 | A1 | 2/2020 | |
| WO | 2020074105 | A1 | 4/2020 | |
| WO | 2020215018 | A1 | 10/2020 | |
| WO | WO-2021091448 | A1 | * 5/2021 | B60K 1/04 |

OTHER PUBLICATIONS

Translated CN-111845437-A (Year: 2025).*
Translated CN-205853862-U (Year: 2025).*
Translated CN-206171159-U (Year: 2025).*
Translated CN-210325889-U (Year: 2025).*
Translated CN-210941319-U (Year: 2025).*
Decision to Grant a Patent issued in counterpart Japanese Patent Application No. JP 2023-550340, dated Jan. 7, 2025.
Extended European Search Report issued in counterpart European Patent Application No. 20961433.8, dated Oct. 2, 2024.
First Office Action issued in counterpart Chinese Patent Application No. 202011246789.0, dated Oct. 11, 2021.
International Search Report and Written Opinion issued in corresponding PCT Application No. PCT/CN2020/139408, dated Jul. 26, 2021.
Refusal Decision issued in counterpart Chinese Patent Application No. 202011246789.0, dated Apr. 25, 2022.
Notice of Reasons for Refusal issued in counterpart Japanese Patent Application No. JP 2023-550340, dated Apr. 30, 2024.
Notification to Grant Patent Right for Invention issued in counterpart Russian Patent Application No. 2023112704/11, dated Apr. 19, 2024.
Office Action issued in counterpart Russian Patent Application No. 2023112704/11 dated Dec. 27, 2023.

* cited by examiner

HOISTING CARRIER VEHICLE OF REPLACEABLE BATTERIES

CROSS-REFERENCE TO RELATED APPLICATIONS

This application is a continuation application of International Application No. PCT/CN2020/139408, filed on Dec. 25, 2020, which claims priority to Chinese Patent Application No. 202011246789.0, filed on Nov. 10, 2020. The disclosures of the above-mentioned applications are incorporated herein by reference in their entireties.

TECHNICAL FIELD

The present application relates to the technical field of battery replacement, and in particular, to a hoisting carrier vehicle of replaceable batteries.

BACKGROUND

Energy saving, environmental protection and safety are always the main themes of automobile development, which are achieved by electrification, intelligence, networking and sharing. However, since the number of charging piles is small, the driving distance of current electric vehicles is short, which affects the promotion and application of electric vehicles at a certain extent.

Some solutions in the prior art increase the number of charging piles to meet the charging demand, and some solutions adopt removable and replaceable power batteries. Since the former solutions spend too long time in charging, they are good technical solutions for passenger cars with short daily driving miles, but not applicable to heavy-duty vehicles such as commercial vehicles that require large capacity of power battery. The latter solutions are applicable to both passenger cars and commercial vehicles, but still suffers from a higher center of gravity of the power battery, an unreliable installation and uneasy replacement. For example, the patent of Shanghai Jiu Xing Energy Technology Co., Ltd. "Load truck with function of battery replacement and charging and power supply method" discloses the solutions of fixing the rectangular battery box on the vehicle. However, the battery box has the instability problem caused by high center of gravity; the patent "Hoisting container AGV transport vehicle of replaceable batteries" discloses that the battery box frame provided above the two battery sub-boxes is provided on the longitudinal beam through the positioning mechanism. However, the battery box structure and positioning structure are too complicated, costly and not stable enough to be installed.

SUMMARY

The application aims to solve the existing technical problem of a high center of gravity of the power battery, the unreliable installation and uneasy replacement.

In order to achieve the above objective, the present application provides a hoisting carrier vehicle of replaceable batteries. The hoisting carrier vehicle of replaceable batteries includes a battery box whose cross section is in a shape of inverted concave font. The battery box is mounted by a locking device on the longitudinal beam of the carrier vehicle in a way of saddle. The battery box includes a battery and a battery frame.

In some embodiments, the battery box whose cross section is in in the shape of the inverted concave font is composed of two inverted L-shape sub-boxes, which are of mirror symmetry and separated type.

In some embodiments, the hoisting carrier vehicle of replaceable batteries further includes an inclining prevention device fixed on the carrier vehicle and in tight abutment with a side of the battery frame close to a cab.

In some embodiments, the battery frame further includes a first bracket, a second bracket and a third bracket. The first bracket is vertically provided on one end of the second bracket and the third bracket is vertically provided on another end of the second bracket, and the second bracket is transversely and horizontally fixed on a top end of the longitudinal beam.

In some embodiments, the locking device includes a first locking portion and a second locking portion. The first locking portion is provided on an outer side of the second bracket, the second locking portion is provided on the top end of the longitudinal beam, and the second bracket is fixed on the top end of the longitudinal beam by the first locking portion fitting with the second locking portion.

In some embodiments, the first locking portion includes a plurality of first locking members provided around the outer side of the second bracket, and the second locking portion includes a plurality of second locking members provided in correspondence one-by-one with the first locking members.

In some embodiments, the locking device further includes a fastener. The first locking member includes a locking through hole and the second locking member includes a locking post fit with the locking through hole, and the locking post is configured to penetrate through the locking through hole to fit the fastener; or the first locking member includes a first locking through hole, the second locking member includes a second locking through hole, and the fastener is configured to sequentially penetrate through the first locking through hole and the second locking through hole to fit the second locking through hole.

In some embodiments, the first locking member includes a first locking body and a locking assembly and the second locking member includes a second locking body, the locking assembly includes a driving rod, an ejecting steel pillar and two locking steel pillars, the first locking body is provided with a locking cavity fit with the locking assembly, both the ejecting steel pillar and the two locking steel pillars are provided inside the locking cavity, and the locking cavity is provided with a first opening and a second opening opposite to the first opening, the first locking body is configured to extend inside the second locking body and the driving rod is configured to extend inside the locking cavity to control a position of the ejecting steel pillar, and the driving rod is configured to control the position of the ejecting steel pillar to make the ejecting steel pillar respectively eject the two locking steel pillars out of the first opening and the second opening to abut against an inner wall of the second locking body for locking; or the driving rod is configured to control the position of the ejecting steel pillar to make the two locking steel pillars stay inside the second locking body, but not abut against the inner wall of the second locking body for unlocking.

In some embodiments, the inclining prevention device includes a support portion, and an end of the inclining prevention device is fixedly connected to the carrier vehicle and another end of the inclining prevention device is abutted against the battery frame.

In some embodiments, the support portion includes at least one inclined support rod.

By adopting the above-mentioned solutions, the application has the following beneficial effects:

The battery box of the hoisting carrier vehicle of replaceable batteries provided by the present application is in a shape of inverted concave font, and the middle portion of the inverted concave font is connected with the longitudinal beam, which may effectively lower the center of gravity of the battery box. Secondly, an inclining prevention device is provided to prevent the battery box from inclining forward when braking, to effectively increase the stability of the battery box. In addition, the battery box may be replaced quickly through the quick locking and unlocking of the locking device.

BRIEF DESCRIPTION OF THE DRAWINGS

In order to more clearly illustrate the technical solutions in the embodiments of the present application, drawings in the embodiments will be briefly described below. Obviously, the drawings in the following description are only some embodiments of the present application. Other drawings can be obtained by those skilled in the art according to the structures shown in the drawings without creative work.

The implementation, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings of the present application. Obviously, the described embodiments are only some rather than all of the embodiments of the present application. Based on the embodiments of the present application, all other embodiments obtained by those skilled in the art without creative efforts shall fall within the scope of the present application.

"One embodiment" or "an embodiment" herein refers to a specific feature, structure or characteristic that may be included in at least one implementation of the present application. In the description of the embodiment of the present application, it should be noted that the orientation or positional relationship indicated by the terms, such as up, down, left, right, front, rear, etc. are based on the drawings, which are only used to facilitate the description of this application and to simplify the description but not intended to indicate or imply that the device or element must in a particular orientation, or be constructed and operated in a particular orientation, which, therefore, should not be considered as limiting of the application.

In addition, the descriptions related to "first", "second" and the like in the present application are merely for descriptive purposes, and should not be understood as indicating or implying their relative importance or implicitly indicating the number of technical features indicated. Therefore, the feature defined by "first" and "second" may explicitly or implicitly include at least one such feature. Further, the terms "first", "second", etc. are used to distinguish similar objects and need not be used to describe a particular order or sequence. It should be understood that the terms so used may be interchanged, where appropriate, so that the embodiments of the present application described herein can be implemented in an order other than those illustrated or described herein.

Figure 1:
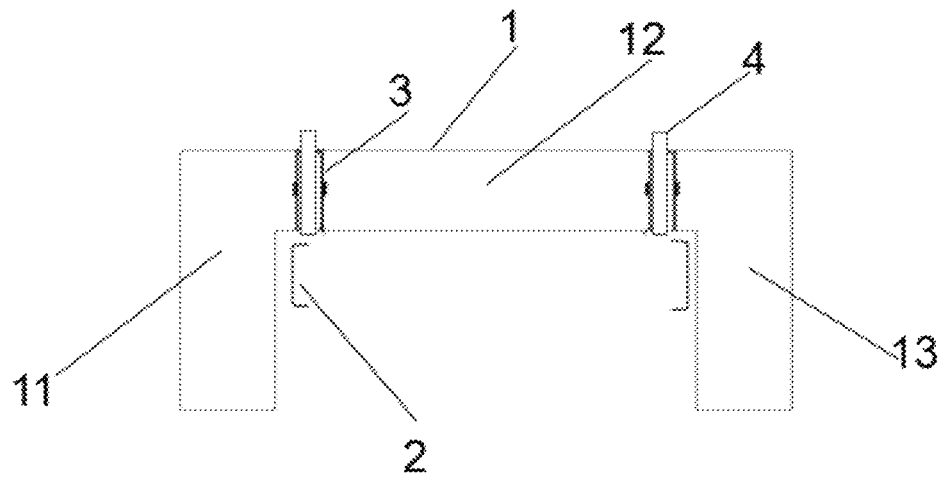
FIG. 1 is a schematic structural view of a battery box according to some embodiments of the present application.
Figure 2:
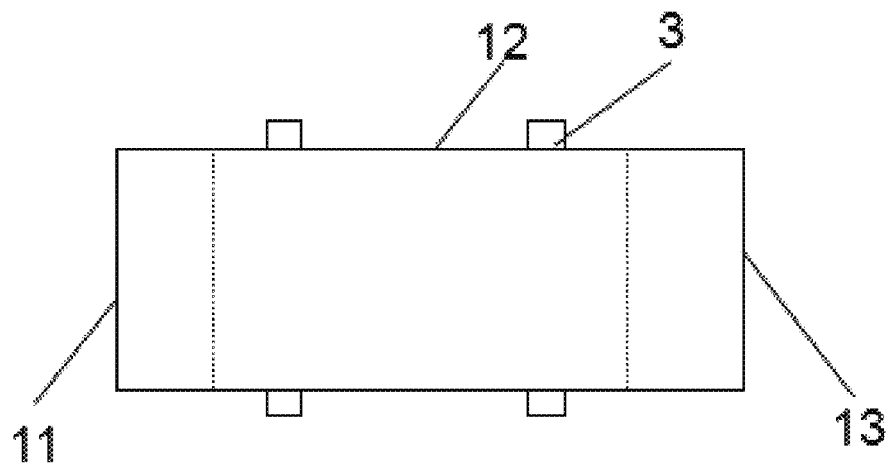
FIG. 2 is a schematic top view of a battery box according to some embodiments of the present application.
Figure 3:
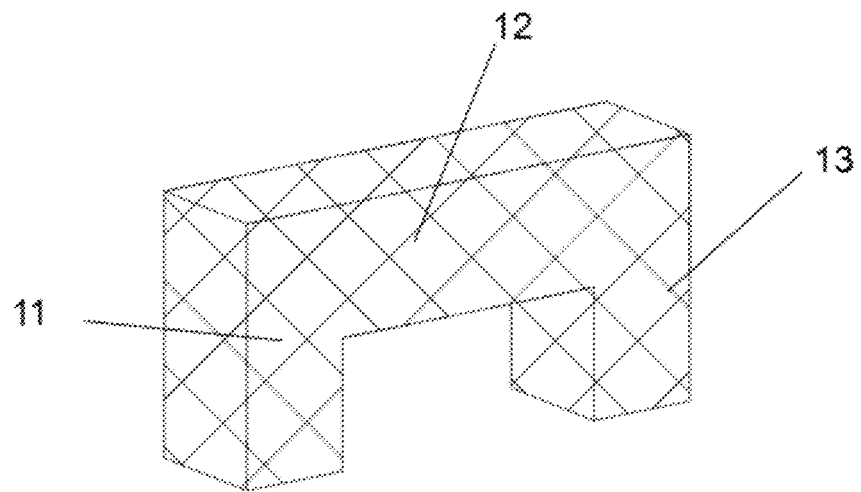
FIG. 3 is a stereoscopic schematic view of a battery box according to some embodiments of the present application.
Figure 4:
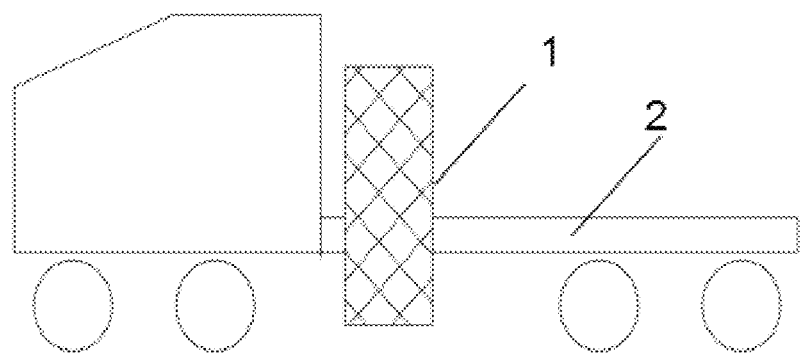
FIG. 4 is a schematic view of a battery box located in a position of the carrier vehicle according to some embodiments of the present application.
Figure 5:
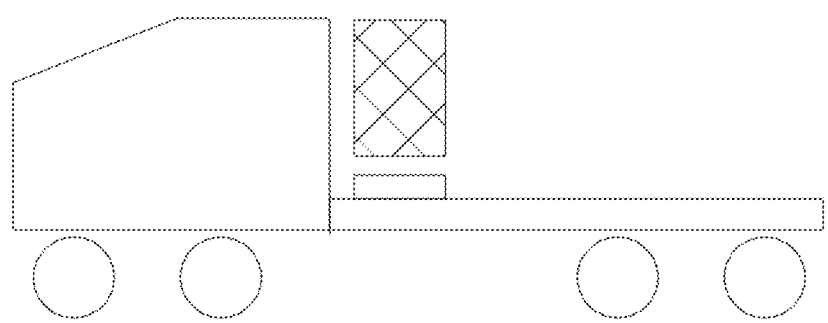
FIG. 5 is a schematic view of a battery box located in a position of the carrier vehicle according to the prior art.

The present application discloses a hoisting carrier vehicle of replaceable batteries including a battery box 1. Referring to FIGS. 1-3, FIG. 1 is a schematic structural view of a battery box 1, FIG. 2 is a schematic top view of a battery box 1, and FIG. 3 is a stereoscopic schematic view of a battery box 1. As shown in FIGS. 1-3, the cross section of the battery box 1 is in the shape of inverted concave font, the battery box 1 is mounted by the locking device on the longitudinal beam 2 of the carrier vehicle in a way of saddle, and the battery box 1 includes a battery and a battery frame. The way of saddle means that the battery box 1 of inverted concave font is inverted on the longitudinal beam 2, such that the longitudinal beam 2 supports the concave section of the battery box 1. As shown in FIG. 4, FIG. 4 is a schematic view of a battery box 1 located in a position of the carrier vehicle according to some embodiments of the present application. The battery box 1 adopts a concave font mechanism. The middle part of the concave font mechanism is connected with the top end of the longitudinal beam 2 and two sides of the mechanism are respectively connected with two sides of the longitudinal beam 2. Compared with the square structure integrally provided on the vehicle in the prior art (as shown in FIG. 5), this configuration may effectively decrease the center of gravity of the battery box 1 and improve the stability of the battery box 1.

In some embodiments of the present application, there is one or more the battery box 1, which can be set according to the demand.

In some embodiments of the present application, the battery box 1 whose cross section is in a shape of inverted concave font is composed of two inverted L-shape sub-boxes, which are of mirror symmetry and separated type. In one implementable solution, the battery in the battery box 1 is an integrated concave font battery, the battery frame is also concave font and the concave font battery is provided in the inverted concave font frame. In another implementable solution, the battery is an integrated inverted concave font battery, and the battery frame is composed of two separate L-shaped frames.

In some embodiments of the present application, the hoisting carrier vehicle of replaceable batteries further includes an inclining prevention device fixed on the carrier vehicle and in tight abutment with a side of the battery frame close to a cab.

The inclining prevention device includes a support portion, and an end of the inclining prevention device is fixedly connected to the carrier vehicle and another end of the inclining prevention device is abutted against the battery frame.

In one embodiment, the support portion includes at least one inclined support rod and the support rods are configured to uniformly support every area of the battery box 1, which may make the force points evenly distributed for better supporting.

It can be implemented that the end of the support rod connected to the battery box 1 may be set as a support plane, and the support plane is abutted against the battery frame. The support plane not only can prevent inclining, but also ensure that the battery box 1 may be replaced directly after unlocking the locking device, which needs no additional steps to disconnect the anti-inclining slope and the battery frame.

In another embodiment, the support portion may be a right-angled triangular support block, one of the right-angled sides of the triangular support block is connected to the vehicle, and the other right-angled side of the triangular support block is connected to the battery frame.

In some embodiments of the present application, the support portion may not only be provided in both the forward and backward inclining directions of the battery frame, but also be provided in both the leftward and rightward inclining direction, which may prevent the battery box 1 from inclining when the vehicle is braking or accelerating and from inclining over when the vehicle is rolled over. The stability of the battery box 1 is ensured by avoiding the battery frame from falling in some directions, to improve the safety to a certain extent.

In some embodiments of the present application, the battery frame may be an integrated structure or a split structure which may be assembled to make the battery be mounted inside the battery frame.

In some embodiments of the present application, the battery frame may be a concave font frame. Specifically, the battery frame further includes a first bracket 11, a second bracket 12 and a third bracket 13.

The first bracket 11 is vertically provided on one end of the second bracket 12 and the third bracket 13 is vertically provided on another end of the second bracket 12, and the second bracket 12 is transversely and horizontally fixed on a top end of the longitudinal beam 2. The first bracket 11 and the third bracket 13 are provided on opposite sides of the vehicle longitudinal beam 2.

In some embodiments of the present application, the hoisting carrier vehicle of replaceable batteries further includes a locking device.

The locking device includes a first locking portion 3 and a second locking portion 4.

The first locking portion 3 is provided on an outer side of the second bracket 12. The second locking portion 4 is provided on the top end of the longitudinal beam 2. The second bracket 12 is fixed on the top end of the longitudinal beam by the first locking portion 3 fitting with the second locking portion 4.

In some embodiments of the present application, the first locking portion 3 includes a plurality of first locking members provided around the outer side of the second bracket 12. For example, four first locking members may be provided on the outer sides of the second bracket 12 of the concave font battery frame and each side is provided with two first locking members. It is implementable that the number of locking members may also be increased as required.

The second locking portion 4 includes a plurality of second locking members provided in correspondence with the first locking members.

In some embodiments of the present application, there are various options for setting the locking device. The following are some of them.

In the first implementable solution, the locking device further includes a fastener. The first locking member includes a locking through hole and the second locking member includes a locking post fit with the locking through hole. The locking post is configured to penetrate through the locking through hole to fit the fastener. The fastener may be a fixed nut and the locking post is provided with threads at the top of the nut to match the nut.

In the second implementable solution, the locking device further includes a fastener, the first locking member includes a first locking through hole and the second locking member includes a second locking through hole. The fastener is configured to sequentially penetrate through the first locking through hole and the second locking through hole to fit the second locking through hole. The second locking through hole is provided with internal threads and the fastener is a bolt with external threads.

Figure 6:
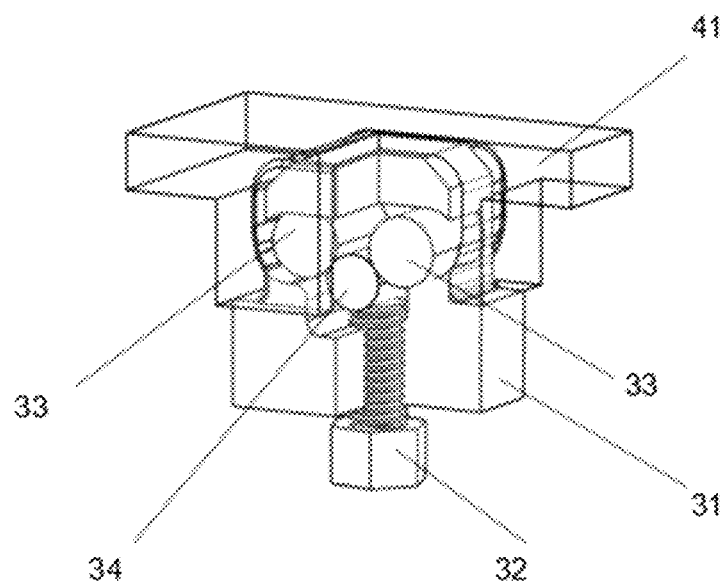
FIG. 6 is a schematic structural view of a locking device according to some embodiments of the present application.

In the third implementable solution, as shown in FIG. 6, the first locking member includes a first locking body 31 and a locking assembly and the second locking member includes a second locking body 41. The locking assembly includes a driving rod 32, an ejecting steel pillar 34 and two locking steel pillars 33. The first locking body 31 is provided with a locking cavity fit with the locking assembly, both the ejecting steel pillar 34 and the two locking steel pillars 33 are provided inside the locking cavity, and the locking cavity is provided with a first opening and a second opening opposite to the first opening. The first locking body 31 is configured to extend inside the second locking body 41 and the driving rod 32 is configured to extend inside the locking cavity to control a position of the ejecting steel pillar 34. The driving rod 32 is configured to control the position of the ejecting steel pillar 34 to make the ejecting steel pillar 34 respectively eject the two locking steel pillars 33 out of the first opening and the second opening to abut against an inner wall of the second locking body 41 for locking; or the driving rod 32 is configured to control the position of the ejecting steel pillar 34 to make the two locking steel pillars 33 stay inside the second locking body 41, but not abut against the inner wall of the second locking body 41 for unlocking.

In some embodiments of the present application, the first locking body is provided with a guide section and the guide section is formed by the outer wall of the clamping section gradually shrinking inward. The locking device in those embodiments of the present application is simple and low cost.

Figure 7:
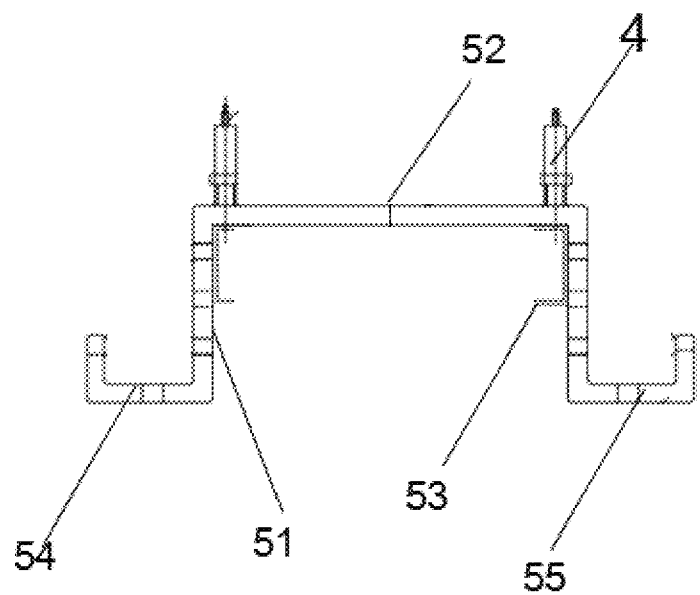
FIG. 7 is a schematic structural view of a mounting bracket according to some embodiments of the present application.
Figure 8:
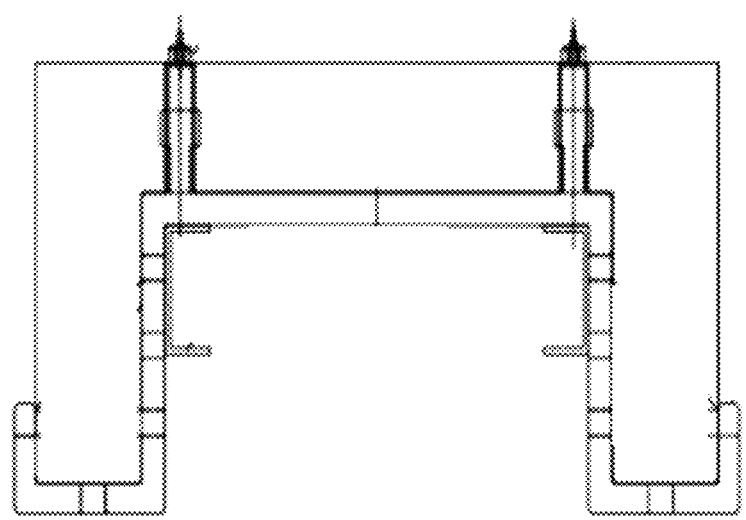
FIG. 8 is a schematic structural view of a battery box engaged with a mounting bracket according to some embodiments of the present application.

In some embodiments of the present application, additional mounting bracket may be included. As shown in FIG. 7, the mounting bracket is fixed to the top end of the vehicle longitudinal beam 2, and the second locking members mentioned above may all be provided on the mounting bracket. FIG. 8 shows a schematic structural view of a battery box 1 engaged with a mounting bracket.

In some implementable solutions, the mounting bracket is a concave font bracket. The mounting bracket includes a first mounting bracket 51, a second mounting bracket 52 and a third mounting bracket 53. The second mounting bracket 52 is fixed on the top end of the longitudinal beam 2. The first mounting bracket 51 is vertically provided on one end of the second mounting bracket 52 and the third mounting bracket 53 is vertically provided on another end of the second mounting bracket 52. The first mounting bracket 51 and the third mounting bracket 53 are provided on opposite sides of the vehicle longitudinal beam 2.

The battery box 1 is connected with the second mounting bracket 52 through the locking device on the battery frame. The first bracket 11 and the third bracket 13 of the battery frame are respectively provided on the first mounting bracket 51 and the third mounting bracket 53.

The first mounting bracket 51 is provided with a first fixing groove 54 and the third mounting bracket 53 is provided with a second fixing groove 55. The first bracket 11 of the battery frame is fixed on the first mounting bracket 51 through the first fixing groove 54. The third bracket 13 of the battery frame is fixed on the third mounting bracket 53 through the second fixing groove 55. The size of the two fixing grooves is suitable to just accommodate the two brackets of the battery frame. The fixing grooves may prevent the battery box 1 from inclining and increase the stability.

The mounting bracket may include a first force-bearing section, and the first force-bearing section includes a first support piece and a second support piece. One end of the first support piece and one end of the second support piece are respectively connected to the two sides of the second mounting bracket 52.

The mounting bracket may include a rod section, which includes a first rod section and a second rod section. An end of the first rod section and an end of the second rod section are respectively connected with the other end of the first support piece and the other end of the second support piece. The other end of the first rod section and the other end of the second rod section are respectively connected with two opposite outer sides of the battery frame.

The battery frame may also be provided with a second force-bearing section which includes a third rod section and a fourth rod section. The third rod section and the fourth rod section are provided crosswise. An end of the third rod section and an end of the fourth rod section are both connected with the top end of the first bracket 11 of the battery frame. The other end of the third rod section extends out of the first bracket 11 to connect the other end of the first rod section. The third rod section is provided in a straight line. The other end of the fourth rod section extends out of the first bracket 11 to connect the other end of the second rod section. The fourth rod section is provided in a straight line. The rod sections in a line have a function for supporting and make the battery keep balance to prevent the battery from falling.

The battery box 1 of the hoisting carrier vehicle of replaceable batteries provided in the application adopts an inverted concave font and the middle portion of the inverted concave font is connected with the longitudinal beam 2, which may effectively lower the center of gravity of the battery box 1. Secondly, an inclining prevention device is provided to prevent the battery box 1 from inclining forward when braking, thereby to effectively increase the stability of the battery box 1. In addition, the battery box 1 may be replaced quickly through the quick locking and unlocking of the locking device.

Finally, it should be noted that the above are only some embodiments of the present application, and do not limit the scope of the present application thereto. Under the concept of the present application, equivalent structural transformations made according to the description and drawings of the present application, or direct/indirect application in other related technical fields are included in the scope of the present application.

What is claimed is:

1. A hoisting carrier vehicle of replaceable batteries, comprising:
    a battery box whose cross section is in a shape of inverted concave font, wherein the battery box comprises a battery and a battery frame;
    a locking device; and
    a longitudinal beam;
    wherein the battery box is mounted by the locking device on the longitudinal beam of the carrier vehicle in a way of saddle;
    the battery frame further comprises a first bracket, a second bracket and a third bracket;
    the first bracket is vertically provided on one end of the second bracket and the third bracket is vertically provided on another end of the second bracket;
    the second bracket is horizontally fixed on a top end of the longitudinal beam;
    the locking device comprises a first locking portion and a second locking portion;
    the first locking portion is provided on an outer side of the second bracket;
    the second locking portion is provided on the top end of the longitudinal beam;
    the second bracket is fixed on the top end of the longitudinal beam by the first locking portion fitting with the second locking portion;
    the first locking portion comprises a plurality of first locking members provided around the outer side of the second bracket; and
    the second locking portion comprises a plurality of second locking members in correspondence one-by-one with the first locking members.

2. The hoisting carrier vehicle of claim 1, wherein the battery box whose cross section is in in the shape of the inverted concave font is composed of two inverted L-shape sub-boxes, which are of mirror symmetry and separated type.

3. The hoisting carrier vehicle of claim 1, wherein the first locking member comprises a first locking body and a locking assembly and the second locking member comprises a second locking body,
    the locking assembly comprises a driving rod, an ejecting steel pillar and two locking steel pillars,
    the first locking body is provided with a locking cavity fit with the locking assembly, both the ejecting steel pillar and the two locking steel pillars are provided inside the locking cavity, and the locking cavity is provided with a first opening and a second opening opposite to the first opening,
    the first locking body is configured to extend inside the second locking body and the driving rod is configured to extend inside the locking cavity to control a position of the ejecting steel pillar, and
    the driving rod is configured to control the position of the ejecting steel pillar to make the ejecting steel pillar respectively eject the two locking steel pillars out of the first opening and the second opening to abut against an inner wall of the second locking body for locking; or
    the driving rod is configured to control the position of the ejecting steel pillar to make the two locking steel pillars stay inside the second locking body, but not abut against the inner wall of the second locking body for unlocking.

* * * * *